(12) United States Patent
Wang et al.

(10) Patent No.: US 11,358,767 B2
(45) Date of Patent: Jun. 14, 2022

(54) LASER SAMPLE CHAMBER FOR DEEP SPACE EXPLORATION

(71) Applicant: Institute of Geology and Geophysics, Chinese Academy of Sciences, Beijing (CN)

(72) Inventors: Yinzhi Wang, Beijing (CN); Fei Wang, Beijing (CN); Wenbei Shi, Beijing (CN); Liekun Yang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 7 days.

(21) Appl. No.: 17/247,910

(22) Filed: Dec. 30, 2020

(65) Prior Publication Data
US 2021/0253320 A1 Aug. 19, 2021

(30) Foreign Application Priority Data
Dec. 31, 2019 (CN) .......................... 201911425107.X

(51) Int. Cl.
*B65D 53/02* (2006.01)
*B64G 4/00* (2006.01)
*B64G 1/10* (2006.01)

(52) U.S. Cl.
CPC ............... *B65D 53/02* (2013.01); *B64G 4/00* (2013.01); *B64G 2001/1064* (2013.01)

(58) Field of Classification Search
CPC .... B65D 53/02; B65D 41/04; B65D 41/0407; B65D 41/0435; B65D 43/021;
(Continued)

(56) References Cited

U.S. PATENT DOCUMENTS 2,172,864 A * 9/1939 Calva ..................... B65D 25/54
206/527
2,961,108 A * 11/1960 Johnson ................. B65D 51/24
215/228
(Continued)

FOREIGN PATENT DOCUMENTS

CA 2445468 A1 * 4/2005 .......... F16L 19/0218
DE 9421224 U1 * 1/1996 ............... E04B 1/68
(Continued)

*Primary Examiner* — J. Gregory Pickett
*Assistant Examiner* — Abigail Elizabeth Guidry
(74) *Attorney, Agent, or Firm* — Mark T. Vogelbacker; Eckert Seamans Cherin & Mellott, LLC

(57) ABSTRACT

A laser sample chamber for deep space exploration includes a sample chamber base and a sample chamber top cover. The sample chamber base is a hollow cylinder with bottom end being sealed and top end being open, and an internal cavity in the hollow cylinder is provided for receiving sample plates; and a body of the sample chamber top cover is a hollow cylinder with a top end being sealed and a bottom end being open, and the body consists of a plurality of components which comprise a hollow annulus positioned at a middle of the sample chamber top cover, a circular viewing window positioned at an opening at a top end of the hollow annulus, and a threaded port positioned at an opening at a bottom end of the hollow annulus and protruding outward.

10 Claims, 4 Drawing Sheets

(58) Field of Classification Search
CPC .... B65D 25/54; B65D 2203/04; B65D 25/56; B64G 4/00; B64G 2001/1064; F16J 15/00; F16J 15/02; F16J 15/04; F16J 15/06; F16J 15/062

See application file for complete search history.

(56) References Cited

U.S. PATENT DOCUMENTS

| | | | | | |
|---|---|---|---|---|---|
| 3,140,007 | A | * | 7/1964 | Nettleship | B01L 3/508 206/508 |
| 3,397,935 | A | * | 8/1968 | Natsume | G02B 23/18 359/413 |
| 3,893,487 | A | * | 7/1975 | Engelking | F16L 55/1108 138/89 |
| 4,005,799 | A | * | 2/1977 | Mannaerts | B65D 39/08 220/288 |
| 4,411,376 | A | * | 10/1983 | Bennett | A47K 5/1201 222/212 |
| 4,463,863 | A | * | 8/1984 | Imagawa | B65D 53/04 215/343 |
| 4,665,309 | A | * | 5/1987 | Derbyshire | B29C 66/114 219/551 |
| 4,765,501 | A | * | 8/1988 | Kao | B65D 11/02 220/4.21 |
| 5,044,514 | A | * | 9/1991 | Portat | B65D 11/06 220/23.87 |
| 5,167,929 | A | * | 12/1992 | Korf | B01L 3/508 422/534 |
| 5,297,688 | A | * | 3/1994 | Beck | B65D 41/0421 215/343 |
| 5,760,975 | A | * | 6/1998 | DiGiovanni | B65D 51/24 359/802 |
| 6,029,842 | A | * | 2/2000 | Sheffler | A45D 40/0068 220/288 |
| 7,337,929 | B2 | * | 3/2008 | Winckels | B65D 47/263 215/380 |
| 7,882,977 | B2 | * | 2/2011 | Johnson | B65D 55/02 220/268 |
| 8,857,647 | B2 | * | 10/2014 | Nakamura | B65D 41/04 220/290 |
| 9,578,765 | B2 | * | 2/2017 | Jackson | H05K 5/0239 |
| 9,834,349 | B1 | * | 12/2017 | Gallagher | B65D 51/28 |
| 11,122,923 | B2 | * | 9/2021 | Jackson | A47J 41/005 |
| 2002/0011498 | A1 | * | 1/2002 | Giblin | B65D 47/06 222/109 |
| 2002/0158072 | A1 | * | 10/2002 | Hotch | B62J 35/00 220/288 |
| 2004/0083809 | A1 | * | 5/2004 | Wech | G01F 23/02 73/323 |
| 2004/0262310 | A1 | * | 12/2004 | Silk | B65D 43/0229 220/288 |
| 2005/0061816 | A1 | * | 3/2005 | Hogan | B65D 50/046 220/288 |
| 2009/0020530 | A1 | * | 1/2009 | Baughman | B65D 39/082 220/288 |
| 2009/0059540 | A1 | * | 3/2009 | Giboney | H05K 9/0056 361/739 |
| 2010/0288759 | A1 | * | 11/2010 | Hotell | B65D 21/0209 220/23.83 |
| 2011/0240647 | A1 | * | 10/2011 | Broyles | F16J 13/02 220/277 |
| 2012/0228298 | A1 | * | 9/2012 | Cronin | B65B 7/2835 220/290 |
| 2012/0248116 | A1 | * | 10/2012 | Smyers | B65D 45/20 220/324 |
| 2014/0311940 | A1 | * | 10/2014 | Braveman | B65D 1/10 206/524.6 |
| 2014/0353274 | A1 | * | 12/2014 | Benson | B65D 39/0076 215/43 |
| 2015/0219517 | A1 | * | 8/2015 | Nguyen | G01L 19/145 277/650 |
| 2015/0291338 | A1 | * | 10/2015 | Chen | B65D 81/268 206/204 |
| 2016/0031611 | A1 | * | 2/2016 | Kranz | B01L 3/50825 220/288 |
| 2016/0091092 | A1 | * | 3/2016 | Bothell | F16J 15/0881 220/378 |
| 2016/0219738 | A1 | * | 7/2016 | Karst | B23K 1/18 |
| 2017/0079217 | A1 | * | 3/2017 | Zappia | B65D 43/0202 |
| 2019/0315534 | A1 | * | 10/2019 | Karli | B65D 50/041 |
| 2020/0339314 | A1 | * | 10/2020 | Meyers | A47G 19/2266 |
| 2020/0407112 | A1 | * | 12/2020 | Miksovsky | A45F 3/20 |
| 2021/0147118 | A1 | * | 5/2021 | Schroeder | G06K 7/10297 |

FOREIGN PATENT DOCUMENTS

| | | | | |
|---|---|---|---|---|
| EP | 3321203 | A1 | * 5/2018 | B65D 43/021 |
| FR | 1181060 | A | * 6/1959 | B65D 25/54 |
| GB | 2023089 | A | * 12/1979 | B65D 11/06 |
| GB | 2234666 | A | * 2/1991 | A47J 36/06 |
| WO | WO-8908055 | A1 | * 9/1989 | B65D 41/0492 |
| WO | WO-2008071838 | A1 | * 6/2008 | B65D 43/022 |
| WO | WO-2020049501 | A1 | * 3/2020 | B65D 41/26 |

* cited by examiner

LASER SAMPLE CHAMBER FOR DEEP SPACE EXPLORATION

CROSS REFERENCE TO RELATED APPLICATION

This application claims the priority to Chinese Patent Application No. 201911425107.X, entitled "LASER SAMPLE CHAMBER FOR DEEP SPACE EXPLORATION" filed with the Chinese Patent Office on Dec. 31, 2019, which is incorporated herein by reference in its entirety.

TECHNICAL FIELD

The present disclosure relates to the field of analytical instruments, and in particular to a laser sample chamber for deep space exploration.

BACKGROUND ART

Humans can improve their abilities of predicting future evolution of the earth and exploiting spatial resources by knowing some major scientific issues such as formation and evolution of solar system and universe, and origin and evolution of life can advance, to drive sustainable development of human society. Performing analysis and testing on the surface matter of the planets and the moon is the first step to study their formation and evolution.

Returnable sampling is a common method for performing analysis of extraterrestrial samples, which can take full advantage of earth laboratories to obtain more accurate ages of the extraterrestrial samples. However, the sustainable application of returnable deep space exploration technology is severely restricted by surging cost, more complex packaging technology, and risks of sample leakage or contamination. Therefore, it is a significant and challenging exploration and attempt to carry out in-situ sampling tests. The Curiosity of the United States, which landed on Mars in 2012, first used a pyrolyzing furnace to heat Martian surface rock samples in-situ to obtain their age. The method improves success rate of data acquisition, but has following problems in respect of data reliability. First, an amount of samples required for a single measurement is large, such large amount of samples are heated in the pyrolyzing furnace, which may be susceptible to problems about samples mixing and non-uniformity, and however only through distinguishing among multiple test substances, well-defined data can be obtained. Second, a heating temperature of the pyrolyzing furnace is limited, and its maximum temperature is 890° C., which is much lower than a high temperature of 1000 to 1200° C. required to extract gases in silicate minerals making up a major part of the extraterrestrial body, leading to incomplete extraction of gases and data whose meaning are difficult to interpret. The erosion temperature applied by an ultraviolet laser to the samples is as high as 3700° C., which effectively solves the problem of temperature limitation of the pyrolyzing furnace. A fast focusing laser beam can perform analysis on micro samples, which can ensure uniformity of the samples to the greatest possible extent and improve accuracy of test results.

Conventional laser sample chambers are made of stainless steel and include a cylindrical hollow base and a cylindrical top cover with a viewing window, both are connected by a stainless steel flange with apertures formed thereon which are connected with bolts, and the bolts need to be applied equal torsion to achieve an insert seal between the stainless steel cutting edge in the flange and oxygen-free copper gasket between flange. If the torsion is not uniform, it is easy to cause air leakage. To ensure the sample chamber and test system being in ultrahigh vacuum, an oxygen-free copper gasket may be used no more than twice and thus needs to be frequently replaced. It is difficult to apply conventional experimental procedure, technical methods, instrument, etc., due to many factors, such as a change in the temperature-pressure environment explored in deep space, an increase in operational difficulty of in-situ analysis and test, and a limitation of load weight. Further, it is also a critical factor to obtain more data that the sample chambers can be reused multiple times on surfaces of the planets and moon. Therefore, it is a very important stage for deep space exploration to invent and design a laser sample chamber that is suit for deep space environments and portable, and whose accessories can be reused multiple times.

SUMMARY (1) Technical Problem to be Solved

A primary object of embodiments is to provide a laser sample chamber for exploring temperature-pressure environment in deep space, and solve problems that the in the conventional laser sample chamber, the operational flow for sealing is complicated and a oxygen-free copper gasket cannot be reused multiple times.

(2) Technical Solutions

It is provided a laser sample chamber for deep space exploration, which includes a sample chamber base 6 and a sample chamber top cover 1, where: the sample chamber base (6) is a hollow cylinder with a bottom end being sealed and a top end being open, an internal cavity (7) of the hollow cylinder is provided for receiving sample plates, and the hollow cylinder is provided with a thread (8) at its inner surface; a body of the sample chamber top cover (1) is a hollow cylinder with a top end being sealed and a bottom end being open, and the body of the sample chamber top cover (1) consists of multiple components which include a hollow annulus (3) positioned at a middle of the sample chamber top cover (1), a circular viewing window (2) positioned at an opening at a top end of the hollow annulus, and a threaded port (4) positioned at an opening at a bottom end of the hollow annulus and protruding outward, the circular viewing window (2), the hollow annulus (3) and the threaded port (4) are closely connected, and central axes of the circular viewing window (2), the hollow annulus (3) and the threaded port (4) are coincident with each other, the bottom end of the sample chamber top cover (1) is inserted into a cavity of the sample chamber base (6) to provide a sealed environment for the sample plates.

In the above solution, the threaded port (4) constituting the sample chamber top cover (1) may be a shape of hollow cylinder with an outer surface having a thread formed therein and an smooth inner surface.

In the above solution, a hollow portion of the hollow annulus (3) may be shaped as a circular, an inner diameter of the hollow annulus (3), a diameter of the circular viewing window (2) and an inner diameter of the threaded port (4) being hollow cylinder may be equal.

In the above solution, apertures (5) are arranged on a top surface of the hollow annulus (3) of the sample chamber top cover (1) and are in axial symmetry with each other, for clamping in place to rotate the whole sample chamber top cover (1).

In the above solution, a hollow cylinder of the sample chamber base (6) may be provided with the thread (8) on an inner surface thereof, the thread on the outer surface of the threaded port (4) is engaged with the thread (8) on the inner surface of the sample chamber base, an outer diameter of the hollow cylinder of the threaded port (4) may be the same as a diameter of the internal cavity (7), and the threaded port (4) of the sample chamber top cover (1) may be hermetically connected with the sample chamber base (6) by screwing into the sample chamber base (6).

Where, the sample chamber top cover (1) and the sample chamber base (6) may be connected in a threaded connection.

The threaded port (4) of the sample chamber top cover (1) being hermetically connected with the sample chamber base (6) by screwing into the sample chamber base (6) may include: performing a high vacuum sealing by employing a flange cutting edge (10) positioned on a top surface of the sample chamber base (6) and an oxygen-free copper gasket (9) positioned on a bottom surface of the hollow annulus (3) of the sample chamber top cover (1), and by rotating the sample chamber top cover (1) progressively close to the sample chamber base (6) to press and bring an inner wall of the oxygen-free copper gasket into contact with an outer side of the flange cutting edge.

The oxygen-free copper gasket (9) may be circular and hollow and have a thickness of 3 mm to 5 mm, and may be brazed on the bottom surface of the hollow annulus (3) of the sample chamber top cover (1).

Where, the flange cutting edge (10) may be made of titanium, and may be in an asymmetrical form with steep outside wall and gentle inside wall.

The flange cutting edge (10) may be provided with an annular groove (11) on its periphery for providing a movement space for the oxygen-free copper gasket (9).

A cross section of the annular groove (11) may be an open trapezoid with a wide top and a narrow bottom, a diameter of the groove may be the same as a diameter of an outermost circumference of the copper gasket, and a depth of the groove may be the same as a thickness of the oxygen-free copper gasket.

Where, the oxygen-free copper gasket (9) may have a width smaller than a straight-line distance from a top of the cutting edge to an outer periphery of the annular groove (11), and thus the oxygen-free copper gasket (9) is able to be placed on upper portions of the groove and the cutting edge in an initial use.

In the above embodiment, the sample chamber top cover (1) and the sample chamber base (6) both may be made of titanium.

(3) Beneficial Effects

1. A sample chamber body and an connection flange of the laser sample chamber for deep space exploration provided in the present disclosure are made of titanium, which has a low density, a high specific strength, and is well suited for cold-hot alternating environment without being subject to a cold brittleness of metal, so that the laser sample chamber meets the requirements for exploration on surface environment in deep space and lightweight device.

2. The laser sample chamber for deep space exploration provided in the present disclosure employs the following designs to simplify operational flow and installation difficulty: apertures are arranged on a top surface of the hollow annulus of the sample chamber top cover and are in axial symmetry with each other, the oxygen-free copper gasket is brazed on the bottom surface of the hollow annulus of the sample chamber top cover, and the threaded port at a bottom of the sample chamber top cover is sealed with thread on an inner surface of the sample chamber base connected by a threaded connection.

3. The laser sample chamber for deep space exploration provided in the present disclosure achieves a high vacuum sealing by pressing and bring the oxygen-free copper gasket brazed on the bottom surface of the hollow annulus of the sample chamber top cover into contact with the outer side of the flange cutting edge in a top surface of the sample chamber base, and achieves an object of reusing multiple times through the copper gasket slowly moving downward along an annular groove in a periphery of the cutting edge with torsion increased in each operation.

DETAILED DESCRIPTION OF THE EMBODIMENTS

In order to make objects, technical solutions and advantages of the present disclosure more apparent, the present disclosure will be further described in detail below combining with the embodiments and the accompanying drawings.

Figure 1:
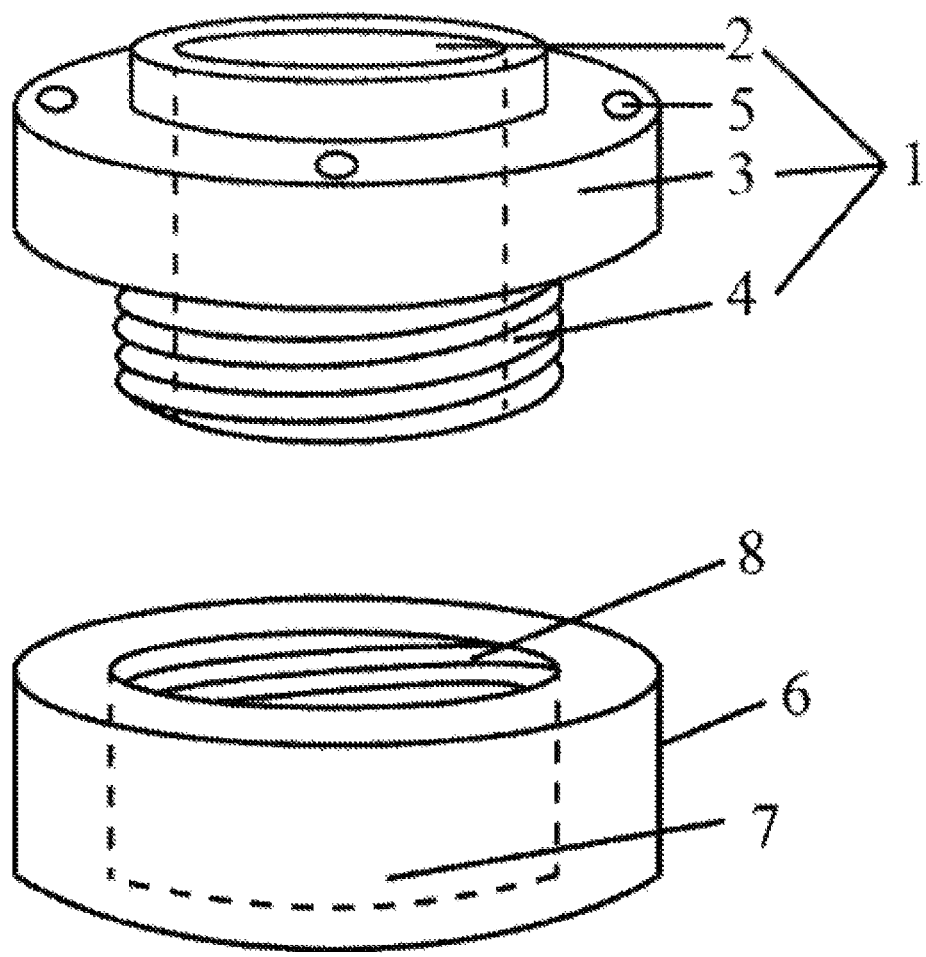
FIG. 1 is a schematic structural view of a laser sample chamber for deep space exploration according to an embodiment of the present disclosure.

As shown in FIG. 1, which is a schematic structural view of a laser sample chamber for deep space exploration according to an embodiment of the present disclosure, the laser sample chamber includes a sample chamber base 6 and a sample chamber top cover 1. The sample chamber base 6 is a hollow cylinder with a bottom end being sealed and a top end being open, an internal cavity 7 of the hollow cylinder is provided for receiving sample plates, and the hollow cylinder is provided with a thread 8 at its inner surface. A body of the sample chamber top cover 1 is a hollow cylinder with a top end being sealed and a bottom end being open, and the body of the sample chamber top cover 1 consists of multiple components, which include a circular viewing window (2) positioned at the top end, a hollow annulus (3) positioned at a middle, and a threaded port (4) positioned at the bottom end. The three components are closely connected and their center axes are coincident.

Figure 2:
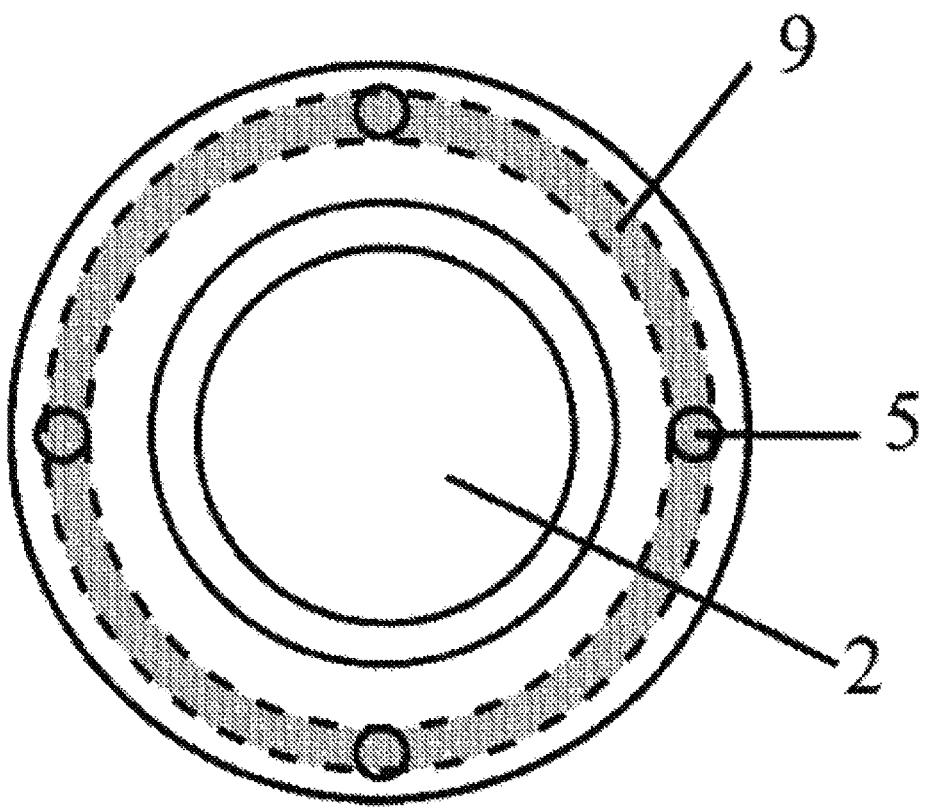
FIG. 2 is a top view of a sample chamber top cover of the laser sample chamber for deep space exploration according to an embodiment of the present disclosure.

Specifically, the hollow annulus 3 at the middle of the sample chamber top cover 1 has a hollow portion with a circular shape. The viewing window 2 is welded at a top opening of the hollow annulus 3 of the sample chamber top cover 1, and the cylindrical threaded port which protrudes outward is connected at a bottom opening of the hollow annulus 3. The threaded port 4 is a hollow cylinder with a threaded outer surface and a smooth inner cylindrical surface. The threaded port 4 has an inner diameter same as an inner diameter of the hollow annulus 3 of the sample chamber top cover 1. A top surface of the middle hollow annulus 3 of the sample chamber top cover 1 is provided with four apertures 5 which are in axial symmetry with each other as shown in FIG. 2. The apertures 5 are cylindrical recesses having a diameter of 1 cm and a height of 0.5 cm.

An outer diameter of the hollow annulus 3 positioned at the middle of the sample chamber top cover 1 is the same as an outer diameter of a sample chamber cavity base 6. An outer diameter of the threaded port 4 at the bottom end of the sample chamber top cover 1 is the same as an inner diameter of the sample chamber cavity base 6. The threaded port 4 at the bottom end of the sample chamber top cover 1 is engaged with a thread 8 on the inner surface of the sample chamber base 6. The sample chamber top cover 1 and the sample chamber base 6 are hermetically connected together by a threaded connection, so as to provide a primary sealing environment for the sample plates.

A thickened oxygen-free copper gasket 9 of thickness 4.0 mm is brazed on a bottom surface of the hollow annulus 3 of the sample chamber top cover 1.

The sample chamber top cover 1 and the sample chamber base 6 are hermetically connected by screwing the threaded port 4 into the thread 8. Specifically, a high vacuum flange sealing is implemented by employing a flange cutting edge 10 positioned on a top surface of the sample chamber base 6 and an oxygen-free copper gasket 9 brazed on the bottom surface of the hollow annulus 3 of the sample chamber top cover 1, and by rotating the sample chamber top cover 1 progressively close to the sample chamber base 6 so as to press and bring an inner wall of the oxygen-free copper gasket 9 into contact with an outer side of the flange cutting edge 10 to realize the high vacuum sealing.

Figure 6:
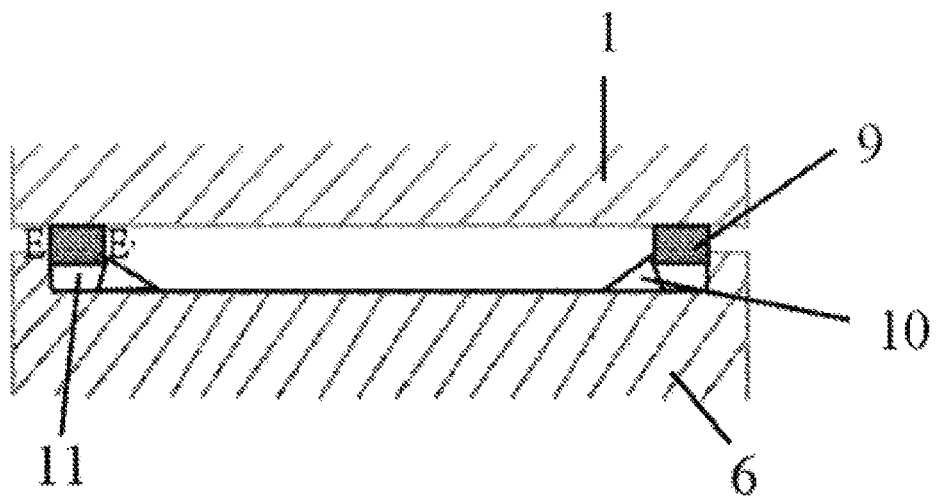
FIG. 6 is a view illustrating a manner of sealing a titanium cutting edge and an oxygen-free copper gasket according to an embodiment of the present disclosure.

Specifically, the cutting edge is made of titanium and positioned on the top surface of the sample chamber base 6. The cutting edge is in an asymmetrical form having a steep outside wall and gentle inside wall, and is provided with an annular groove 11 on its periphery. The annular groove 11 has an outer diameter identical to an outer diameter of the oxygen-free copper gasket 9, and has a depth same as a thickness of the oxygen-free copper gasket. The oxygen-free copper gasket 9 is a hollow circular sheet and made of a material in which copper content is greater than 99.97% by weight. The mounting location of the oxygen-free copper gasket and a difference E-E' between the inner and outer diameters of the oxygen-free copper gasket are designed to enable an outer wall of the oxygen-free copper gasket to closely contact with a periphery of the annular groove 11 as the sample chamber top cover 1 is rotated progressively close to the sample chamber base, so that the inner wall of the oxygen-free copper gasket 9 is in contact with and pressed on an outer side of the cutting edge to achieve a desired sealing condition as shown in FIG. 6. The oxygen-free copper gasket 9 may deforms when being subject to press, and in view of this, the conventional thickness is increased from 2.0 mm to 4.0 mm, so a deformation range of the gasket can be widened, and a number of use of a single gasket can be increased. Also, in order to avoid an air leakage or damage to accessories caused by the misalignment of a movable gasket placed by a robotic arm in multiple operations during a deep space operation. The present disclosure provides a sample chamber which does not need to replace the gasket, but braze the movable oxygen-free copper gasket to the bottom surface of the annulus 3 at the middle of the sample chamber top cover. The oxygen-free copper gasket is a gasket having a thickness of 3 mm to 5 mm as shown in FIG. 2.

The sample chamber top cover 1, the sample chamber base 6 and a flange cutting edge provided by the present disclosure are made of titanium, in consideration of the following significant advantages of titanium in performance: (1) low density and high strength, titanium metal being 43% lighter than steel, but having a mechanical strength comparable to steel, and a high strength at the head of the metal, enabling a relative small cross-section to meet the strength requirements and weight of the structure itself to be significantly reduced; (2) good tolerance to high and low temperature, many extraterrestrial objects having a large temperature difference between day and night due to lack of outer atmosphere or relative low heat capacity and thermal conductivity of its surface mass, titanium metal being well suited for alternating cold and hot environments without being subject to a cold brittleness of metal. The two features meet the requirements for exploration of surface environment in deep space and lightweight device.

For detailed illustration, the disclosure also provides examples 1 and 2. Example 1 is used to illustrate a process of brazing the oxygen-free copper gasket on the bottom surface of the hollow annulus 3 of the sample chamber top cover, which includes the following steps of:

A. pretreating the oxygen-free copper gasket, where the oxygen-free copper gasket is polished to obtain a smooth surface, the polished surface of the oxygen-free copper gasket is washed in acetone solution, and then rinsed with anhydrous ethanol and dried;

B. pretreating the bottom surface of the hollow annulus 3, where the bottom surface of the hollow annulus 3 is polished to obtain a smooth surface, the polished surface is washed in acetone solution and then rinsed with anhydrous ethanol and dried;

C. providing gas shield for brazing the copper-oxygen-free gasket on the bottom surface of the hollow annulus 3, where the brazing process is carried out in a vacuum or inert gas environment to protect a heated portion of the titanium copper metal from sucking reactive gas into welding seams to generate a gas;

D. brazing the oxygen-free copper gasket to the bottom surface of the hollow annulus 3, where the brazing is performed by employing a tungsten inert gas welding through adding elements, such as Mo, Nb and Ta, to an intermediate barrier layer between the oxygen-free copper gasket and the bottom surface of the hollow annulus 3 to obtain a single phase 13 titanium alloy with a structure similar to that of copper. During welding, the welding wire should be fed smoothly and uniformly, and the heated portion must always be protected by argon from contamination. The temperature for brazing is 950 to 1000 Celsius Degree; and E. performing a post processing after the welding, where residual stress at a joint is removed, and the oxygen-free copper gasket and the hollow annulus 3 brazed both are held at 500 Celsius Degree for 1 h.

Example 2 is used to illustrate a manner of sealing the sample chamber in high vacuum, as follows.

Figure 4:
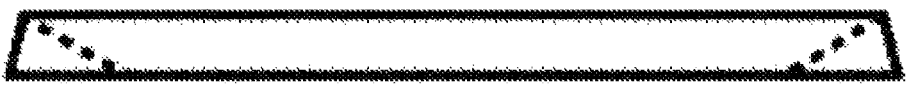
FIG. 4 is a front view of a titanium cutting edge according to an embodiment of the present disclosure.
Figure 5:
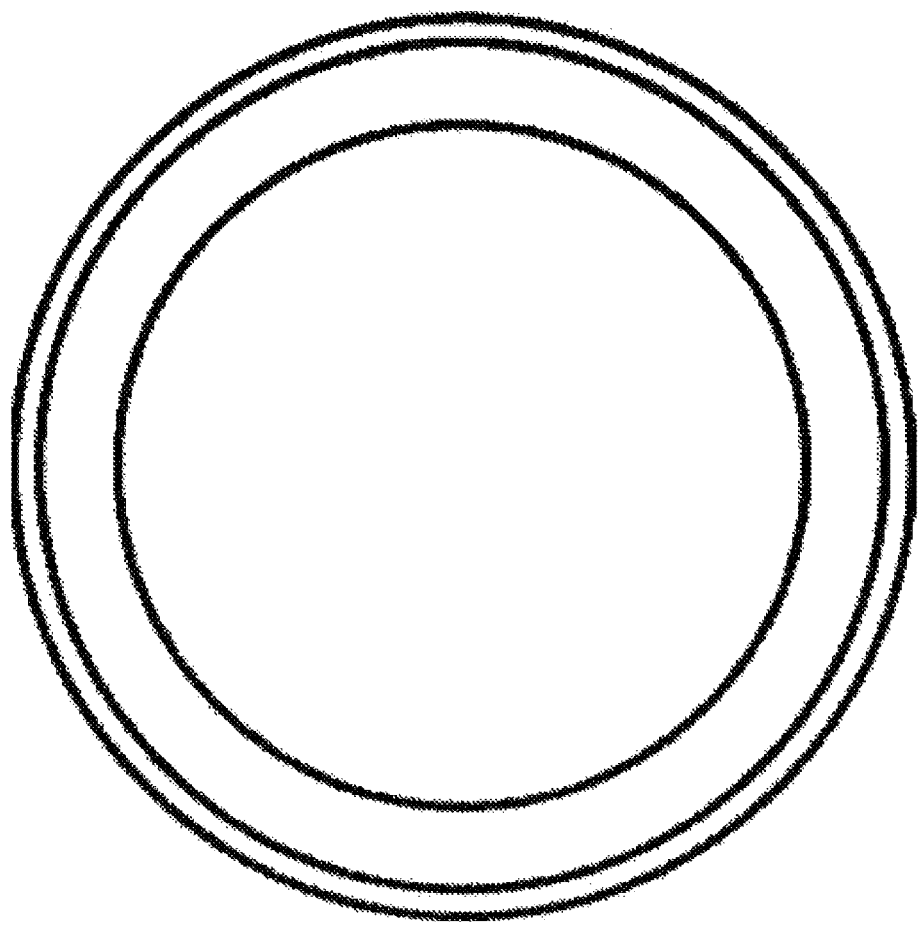
FIG. 5 is a top view of the titanium cutting edge according to an embodiment of the present disclosure.

The manner of sealing the sample chamber is described in detail with reference to FIG. 6 which is a view illustrating a manner of sealing the flange cutting edge and the oxygen-free copper gasket. The sample chamber base 6 is provided with the cutting edge 10 at its top surface, which is in an asymmetrical form having a steep outside wall and gentle inside wall. FIG. 4 is a front view of the flange cutting edge. FIG. 5 is a top view of the flange cutting edge. The cutting edge is provided with an annular groove 11 on its periphery. A cross section of the annular groove 11 is an open trapezoid with a wide top and a narrow bottom. A depth of the groove is the same as a thickness of the oxygen-free copper gasket. A difference E-E' between an inner radius and an outer radius of the copper gasket is slightly smaller than a distance from a top of the cutting edge to the periphery of the groove and the copper gasket is captured in the groove, that is an outside of the copper gasket is closely connected with an outer wall of the groove, and an inside of the copper gasket is in close contact with the outside of the cutting edge. With the increase of the number of use and an increase of rotational torsion, the gasket deforms and slowly moves downward, to a bottom of the groove which means that the gasket reaches a limit of use, under pressing of both the outer side of the groove and the outer side of the cutting edge.

Figure 3:
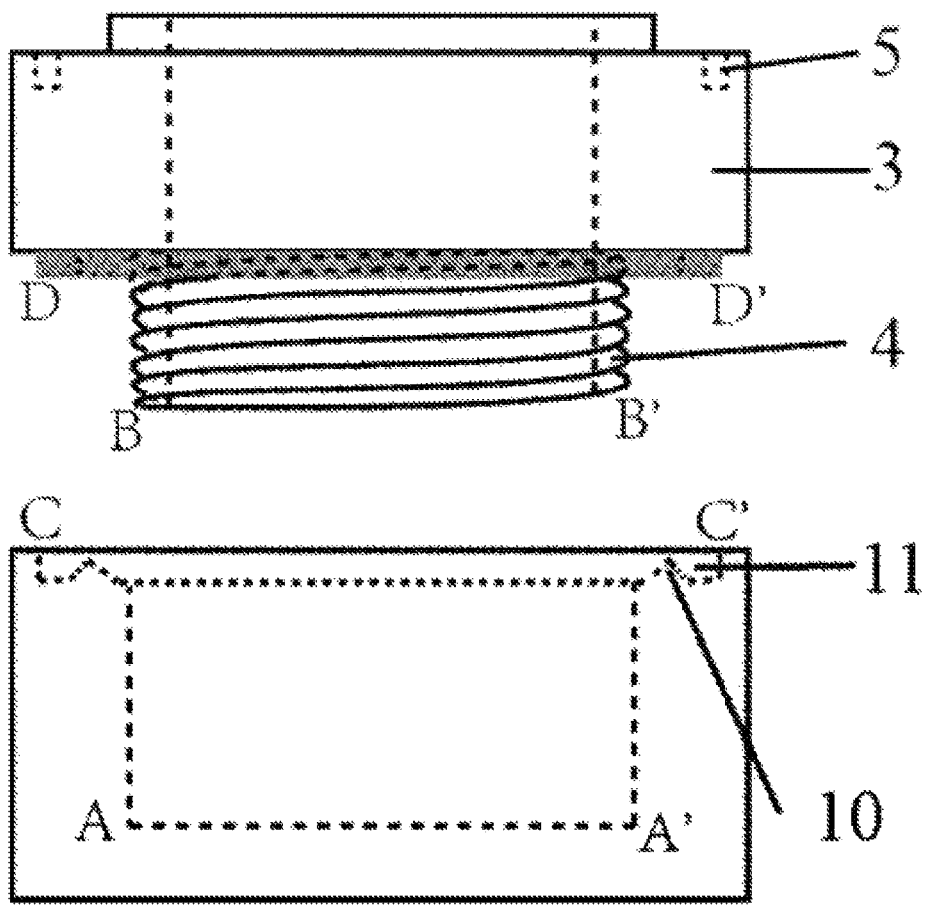
FIG. 3 is a front view of the laser sample chamber for deep space exploration according to an embodiment of the disclosure.

As shown in FIG. 3, the hollow threaded port 4 on the bottom of the sample chamber top cover 1 has an outer diameter B-B' same as an inner diameter A-A' of the sample chamber cavity base 6. The annular groove 11 at the periphery of the flange cutting edge has an outer diameter C-C' same as an outer diameter D-D' of the oxygen-free copper gasket 9. The axes of the hollow threaded port 4, the cavity base 6, the oxygen-free copper gasket 9 and an axis of symmetry of the annular groove 11 coincide with each other. When the sample chamber is closed, the threaded port 4 of the sample chamber top cover is aligned with the cavity of the sample chamber base 6 and is rotated to engage the oxygen-free copper gasket with the groove at the peripheral of the cutting edge.

The titanium material used in the sample chamber minimizes the load weight while meeting the required strength requirements. The design of the apertures 5 and the threaded port 4 on the sample chamber top cover 1 facilitates the operation of the robotic arm in the deep space environment. The thickened, fixed oxygen-free copper gasket can simplifies handling and increases the number of use. Further, the sealing manner of the oxygen-free copper gasket being in contact with and pressed on the periphery of the flange cutting edge enables the oxygen-free copper gasket to be reused multiple times, while meeting the required high vacuum levels.

The objects, technical solutions and beneficial effects of the present disclosure are further illustrated in detail by the above embodiments. It should be understood that the above description is only embodiments of the present disclosure and are not intended to limit to the present disclosure. Any modification, equivalent replacement, improvement, etc. made within the spirit and principle of the present disclosure shall fall within the protection scope of the present disclosure.

What is claimed is:

1. A laser sample chamber for deep space exploration, comprising:
   a sample chamber base (6), formed as a first hollow cylinder with a bottom end being sealed and a top end being open, an internal cavity (7) of the first hollow cylinder is provided for receiving sample plates, and the first hollow cylinder is provided with a thread (8) at its inner surface; and
   a sample chamber top cover (1), a body of the sample chamber top cover (1) formed as a second hollow cylinder with a top end being sealed and a bottom end being open, the body comprising:
   a hollow annulus (3) positioned at a middle of the sample chamber top cover (1),
   a circular viewing window (2) positioned at an opening at a top end of the hollow annulus, and
   a threaded port (4) positioned at an opening at a bottom end of the hollow annulus and protruding outward,
   wherein the circular viewing window (2), the hollow annulus (3) and the threaded port (4) are closely connected, and central axes of the circular viewing window (2), the hollow annulus (3) and the threaded port (4) are coincident with each other, the bottom end of the sample chamber top cover (1) is inserted into the internal cavity of the sample chamber base (6) to provide a sealed environment for the sample plates;
   wherein the threaded port (4) of the sample chamber top cover (1) and the sample chamber base (6) are high vacuum sealed by employing a flange cutting edge (10) positioned on a top surface of the sample chamber base (6) and an oxygen-free copper gasket (9) positioned on a bottom surface of the hollow annulus (3) of the sample chamber top cover (1), and wherein the sample chamber top cover (1) is rotated progressively close to the sample chamber base (6) to press and bring an inner wall of the oxygen-free copper gasket into contact with an outer side of the flange cutting edge;
   wherein the flange cutting edge (10) is provided with an annular groove (11) on its periphery for providing a movement space for the oxygen-free copper gasket (9); and
   wherein a cross section of the annular groove (11) is an open trapezoid with a wide top and a narrow bottom, a diameter of the groove being the same as a diameter of an outermost circumference of the copper gasket, and a depth of the groove being the same as a thickness of the oxygen-free copper gasket.

2. The laser sample chamber for deep space exploration according to claim 1, wherein, the threaded port (4) constituting the sample chamber top cover (1) is shaped as a third hollow cylinder with an outer surface having a thread formed thereon and an smooth inner surface.

3. The laser sample chamber for deep space exploration according to claim 2, wherein, a hollow portion of the hollow annulus (3) is shaped as a circular, an inner diameter of the hollow annulus (3), a diameter of the circular viewing window (2) and an inner diameter of the third hollow cylinder of the threaded port (4) are equal.

4. The laser sample chamber for deep space exploration according to claim 1, wherein, apertures (5) are arranged on a top surface of the hollow annulus (3) of the sample chamber top cover (1) and are in axial symmetry with each other, for clamping the sample chamber top cover (1) in place to rotate the whole sample chamber top cover (1).

5. The laser sample chamber for deep space exploration according to claim 2, wherein, the first hollow cylinder of the sample chamber base (6) is provided with the thread (8) on an inner surface thereof, the thread on the outer surface of the threaded port (4) is engaged with the thread (8) on the inner surface of the sample chamber base, an outer diameter of the third hollow cylinder of the threaded port (4) is the same as a diameter of the internal cavity (7), and the threaded port (4) of the sample chamber top cover (1) is hermetically connected with the sample chamber base (6) by screwing into the sample chamber base (6).

6. The laser sample chamber for deep space exploration according to claim 5, wherein, the sample chamber top cover (1) and the sample chamber base (6) are connected by a threaded connection.

7. The laser sample chamber for deep space exploration according to claim 1, wherein, the oxygen-free copper gasket (9) is circular and hollow and has a thickness of 3 mm to 5 mm, and is brazed on the bottom surface of the hollow annulus (3) of the sample chamber top cover (1).

8. The laser sample chamber for deep space exploration according to claim 1, wherein the flange cutting edge (10) is made of titanium, and is in an asymmetrical form with an outside wall steeper than an inside wall.

9. The laser sample chamber for deep space exploration according to claim 1, wherein the oxygen-free copper gasket (9) has a width smaller than a straight-line distance from a top of the cutting edge to an outer periphery of the annular groove (11), and thus the oxygen-free copper gasket (9) is able to be placed on upper portions of the groove and the cutting edge in an initial use.

10. The laser sample chamber for deep space exploration according to claim 1, wherein, the sample chamber top cover (1) and the sample chamber base (6) both are made of titanium.

* * * * *